(12) United States Patent
Gordon (10) Patent No.: US 11,540,500 B1
(45) Date of Patent: Jan. 3, 2023

(54) KNOTLESS FISHING LINE CONNECTION SYSTEM

(71) Applicant: Tom Gordon, Citrus Heights, CA (US)

(72) Inventor: Tom Gordon, Citrus Heights, CA (US)

( * ) Notice: Subject to any disclaimer, the term of this patent is extended or adjusted under 35 U.S.C. 154(b) by 0 days.

(21) Appl. No.: 17/732,350

(22) Filed: Apr. 28, 2022

(51) Int. Cl.
*A01K 91/04* (2006.01)

(52) U.S. Cl.
CPC .................... *A01K 91/04* (2013.01)

(58) Field of Classification Search
CPC ....... A01K 91/03; A01K 91/04; A01K 91/047
See application file for complete search history.

(56) References Cited

U.S. PATENT DOCUMENTS

| | | | | |
|---|---|---|---|---|
| 2,305,234 A * | 12/1942 | Bratz | ...................... | F16G 11/10 24/581.1 |
| 2,552,248 A * | 5/1951 | Zavod | .................... | A01K 91/04 403/182 |
| 3,091,885 A * | 6/1963 | Ulsh | ...................... | A01K 85/00 43/43.12 |
| 3,123,881 A * | 3/1964 | Westman | ............... | A01K 91/04 24/701 |
| 3,148,423 A * | 9/1964 | Anspach | ................. | A01K 91/04 403/209 |
| 3,898,760 A | 8/1975 | Klein | | |
| 4,177,598 A * | 12/1979 | Jolley | .................... | A01K 91/04 43/42.49 |
| 4,745,701 A * | 5/1988 | Fry | ........................ | A01K 85/00 43/42.49 |
| 5,251,396 A * | 10/1993 | Haigh | ..................... | A01K 91/18 43/44.84 |
| 5,301,454 A * | 4/1994 | Chen | ....................... | A01K 91/03 24/663 |
| 5,577,339 A * | 11/1996 | Haigh | ..................... | B29C 69/02 24/666 |
| 2005/0039376 A1 * | 2/2005 | Blette | .................. | A01K 91/047 43/43.1 |
| 2007/0227059 A1 * | 10/2007 | Cox | ...................... | A01K 91/047 43/44.87 |
| 2017/0215400 A1 * | 8/2017 | Peguero | ................. | A01K 91/04 |

* cited by examiner

*Primary Examiner* — Richard G Davis
(74) *Attorney, Agent, or Firm* — Morgan Law Offices, PLC (57) ABSTRACT

A knotless fishing line connection system employs one or more knotless fishing line connectors. Each knotless fishing line connector includes an engaging member coupled to a socket member configured to receive and lock the engaging member. The knotless fishing line connector can be used to secure a fishing line to a fishing hook. Another such knotless fishing line connector can be used to connect the fishing line to a swivel connector or the like. A fishing rig can include a fishing leader line having a first engaging member and a second engaging member on opposite distal ends thereof. The rig can further include a fishing hook having a first engaging member configured to receive and lock the first engaging member and a swivel connector or the like having a second engaging member configured to receive and lock the second engaging member.

5 Claims, 10 Drawing Sheets

KNOTLESS FISHING LINE CONNECTION SYSTEM

TECHNICAL FIELD

The present disclosure relates generally to fishing equipment, and more particularly, to a knotless fishing line connection system. The knotless fishing line system employs one or more knotless fishing line connectors.

BACKGROUND

Although fishing hooks come in various shapes, styles, and sizes, they all essentially function in the same way. That is, fishing hooks are used to catch fish by impaling them in the mouth. Fishing hooks are of course connected to fishing lines which allow the fish to be hauled in. A conventional fishing hook includes a hole, called an eye. The tip of the fishing line is inserted through the eye and a knot is tied to secure the line to the fishing hook.

Unfortunately, such knots can fail for various reasons such as slippage or breakage and are known failure points. Indeed, knots are the weakest link in the entire fishing line arrangement. While numerous types of knots have been tried, fish still frequently get away due to knot failure.

SUMMARY

A knotless fishing line connection system employs one or more knotless fishing line connectors.

Each knotless fishing line connector includes an engaging member coupled to a socket member configured to receive and lock the engaging member. In an embodiment, the socket member further includes a retention tab to further secure the coupling. The knotless fishing line connector can be used to secure a fishing line to a fishing hook. Another such knotless fishing line connector can be used to connect the fishing line to another piece of fishing equipment such as a swivel connector or the like. A fishing rig can include a fishing leader line having a first engaging member and a second engaging member on opposite distal ends thereof. The rig can further include a fishing hook having a first socket member configured to receive and lock the first engaging member and a swivel connector or the like having a second socket member configured to receive and lock the second engaging member.

In one embodiment, each socket member includes a cavity and a slot extending along a length of a lateral side that opens into the cavity. Each engaging member comprises a block having a shape complementary to the cavity. The block of each engaging member preferably includes a projecting member. The projecting member acts as a handle and facilitates the assembly and disassembly from the fishing leader. Further, a retention tab on the socket member can be configured to maintain the position of the engaging member.

In operation, an end of the leader line is slid through the slot of the first socket member into its cavity and the leader line is pulled back until the block of the first engaging member locks within the cavity of the first socket member, thereby the first end of the leader line is locked with the fishing hook member. The other end of the leader line is slid through the slot of the second socket member into its cavity and the leader line is pulled back until the block of the second engaging member locks within the cavity of the second socket member, thereby the other end of the leader line is locked with the swivel connector.

DETAILED DESCRIPTION OF EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the same or identical elements throughout.

Figure 1:
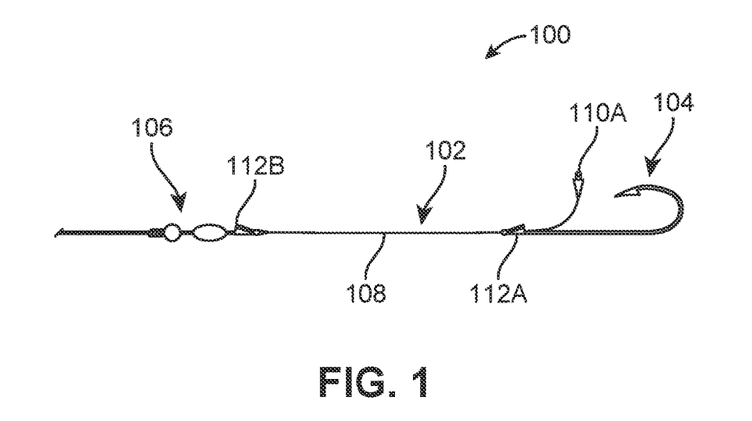
FIG. 1 exemplarily illustrates an example fishing rig according to an embodiment of the present invention.
Figure 2:
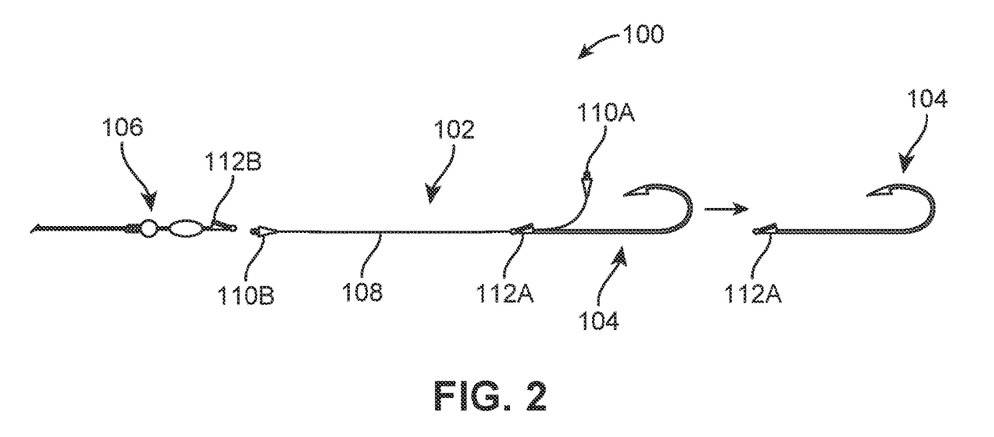
FIG. 2 exemplarily illustrates an assembly of a fishing leader with a fishing hook structure and a swivel of FIG. 1.

Referring to FIG. 1, an example fishing rig 100 allowing knotless connections of a fishing leader 102 to a fishing hook member 104 and swivel 106, is illustrated. FIG. 2 exemplarily illustrates the assembly of fishing leader 102 with the fishing hook member 104 and the swivel 106 of FIG. 1. Referring to FIG. 1 and FIG. 2, the fishing rig 100 comprises the fishing leader 102, the fishing hook member 104, and the swivel 106. The fishing leader 102 comprises a leader line 108 that has a first end and a second end. The first end of the leader line 108 has a first engaging member 110A and the second end of the leader line has a second engaging member 110B. The fishing hook member 104 comprises a first socket member 112A and the swivel 106 comprises a second socket member 112B.

Figure 3:
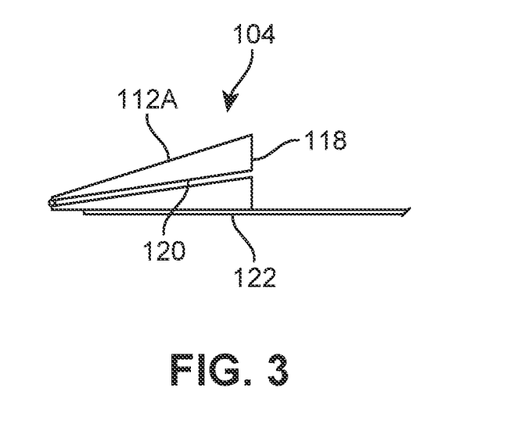
FIG. 3 exemplarily illustrates a first socket member of the fishing hook member of FIG. 1.

Referring to FIG. 3, each socket member 112A, and 112B (not shown in FIG. 3) comprises a cavity 118 (which can be substantially conical) and a slot 120 extending along a length of the block that opens into the cavity 118. The slot 120 is preferably slightly less wide than the fishing line used and is structured to allow fishing line to be slid or pushed through the slot 120 by hand without the fishing line slipping out during typical usage. The socket member 112A is mounted to a shank 122 of a fishing hook member 104 so as to become integral with the fishing hook member 104. Each engaging member 110A, 110B comprises a block having a shape complementary to the cavity 118. The conical block of each engaging member 110A, 110B comprises a projecting member 126A, 126B (shown in FIG. 9A). The projecting members 126A, 126B act as a handle and facilitate the assembly and disassembly from the fishing leader 102.

Figure 4A:
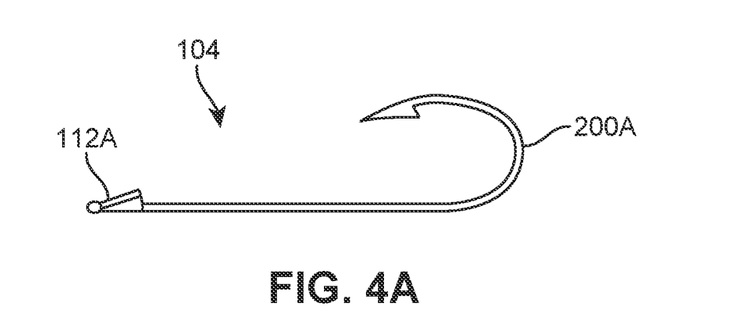
FIG. 4A to FIG. 4I exemplarily illustrates various types of fishing hook structures having the first socket member of FIG. 1.
Figure 4B:
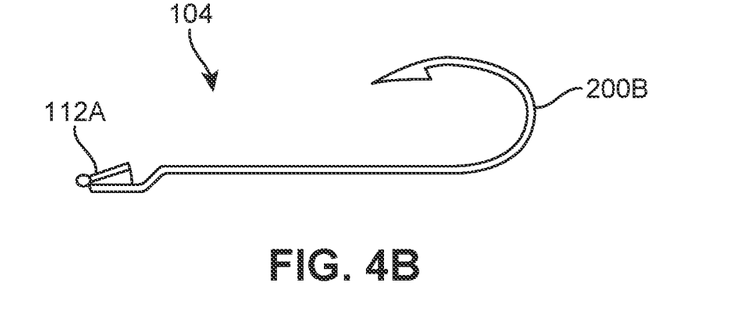
Figure 4C:
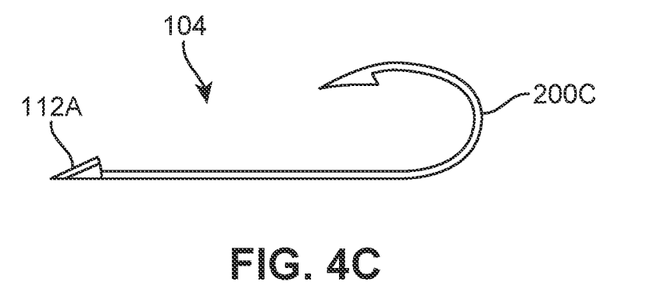
Figure 4D:
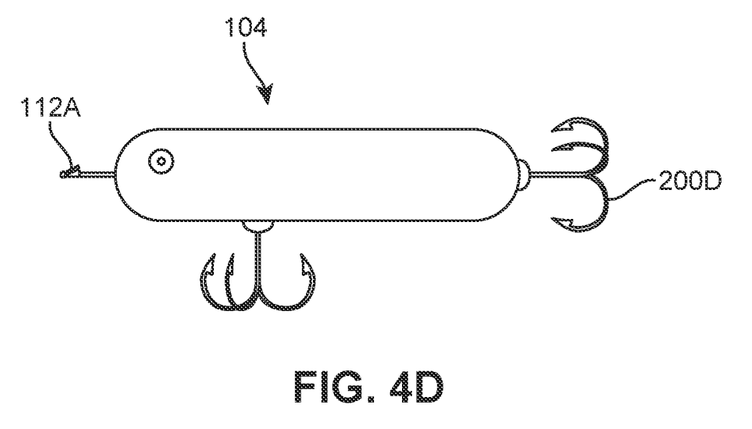
Figure 4E:
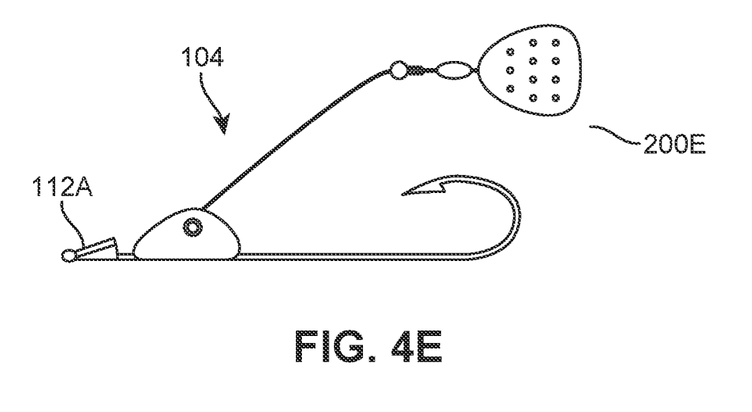
Figure 4F:
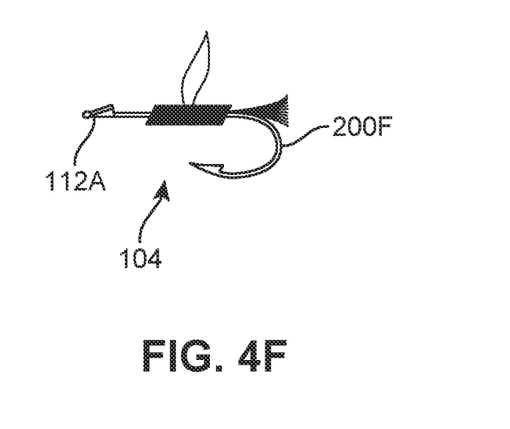
Figure 4G:
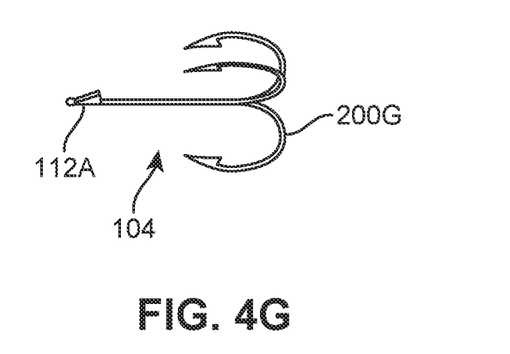
Figure 4H:
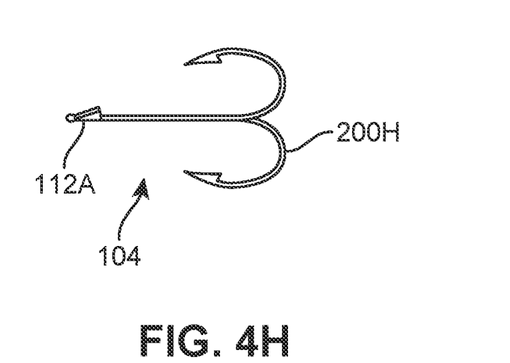
Figure 4I:
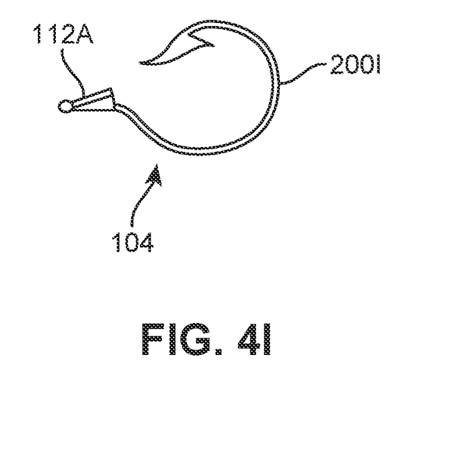

Referring to FIG. 4A, the fishing hook member 104 comprises a straight hook 200A and the first socket member 112A. Referring to FIG. 4B, the fishing hook member 104 comprises an offset hook 200B and the first socket member 112A. Referring to FIG. 4C, the fishing hook member 104 comprises an angled hook 200C and the first socket member 112A. Referring to FIG. 4D, the fishing hook member 102 has a direct on lure 200D and the first socket member 112A. Referring to FIG. 4E, the fishing hook member 104 comprises a spinner bait and hook 200E and the first socket member 112A. Referring to FIG. 4F, the fishing hook member 104 comprises a fly hook 200F and the first socket member 112A. Referring to FIG. 4G, the fishing hook member 104 comprises a treble hook 200G and the first socket member 112A. Referring to FIG. 4H, the fishing hook member 104 comprises a double hook 200H and the first socket member 112A. Referring to FIG. 4I, the fishing hook member 104 comprises a circle hook 200I and the first socket member 112A. It is to be understood that the illustrated hook members 104 is meant to be a non-limiting list of such hook members 104 and other such hooks in various different shapes, sizes, and proportions are useable in conjunction with the present disclosure.

Figure 5A:
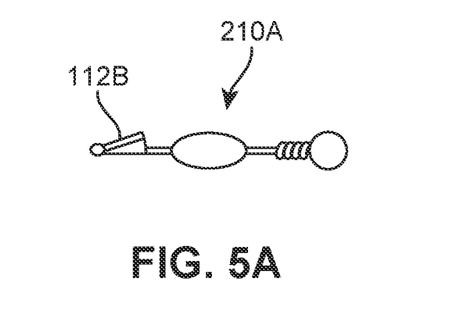
FIG. 5A and FIG. 5B exemplarily illustrates various types of swivels having a second socket member of FIG. 1.
Figure 5B:
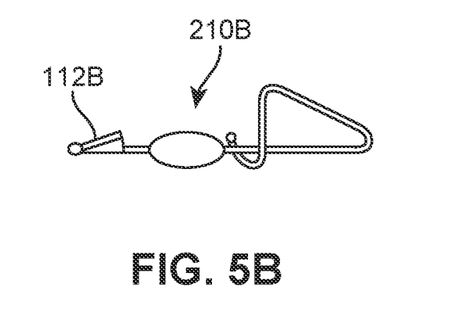
Figure 6A:
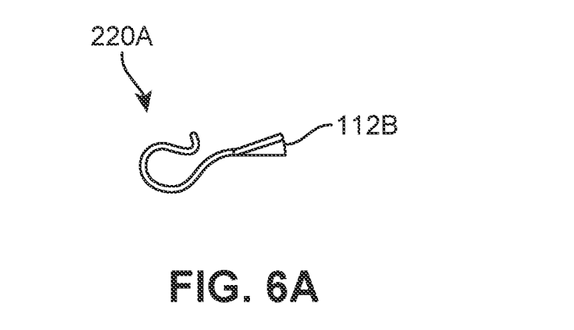
FIG. 6A and FIG. 6B exemplarily illustrates various types of fishing tackles having the socket member of FIG. 1.
Figure 6B:
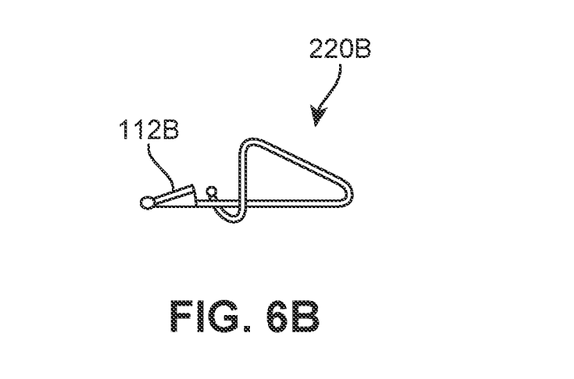

Referring to FIG. 5A, the swivel 102 is a barrel swivel 210A with the second socket member 112B. Referring to FIG. 5B, the swivel 102 is a snap swivel. Referring to FIG. 6A, the fishing tackle is a quick clip 220A with one or more socket member 112B, according to one embodiment of the present invention. Referring to FIG. 6B, the fishing tackle is a snap 220B with one or more socket member 112B, according to another embodiment of the present invention. It is to be understood that the illustrated swivels 102 is meant to be a non-limiting list of such swivels 102 and other such swivels in various different shapes, sizes, and proportions are useable in conjunction with the present disclosure.

Figure 7:
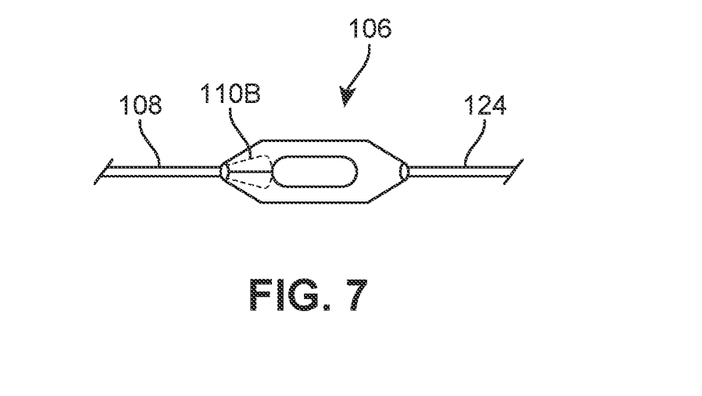
FIG. 7 exemplarily illustrates a second end of the leader line connected with the swivel of FIG. 1.

Referring to FIG. 7, the second end of the leader line 108 is coupled to the swivel 106 connected to a main fishing line 124. The second engaging member 110B locked with the swivel 106.

Figure 8A:
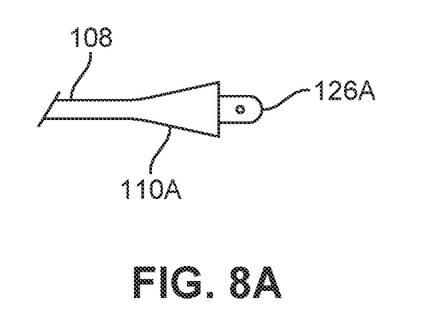
FIG. 8A exemplarily illustrates a side view of the first engaging member of the leader line of FIG. 1.
Figure 8B:
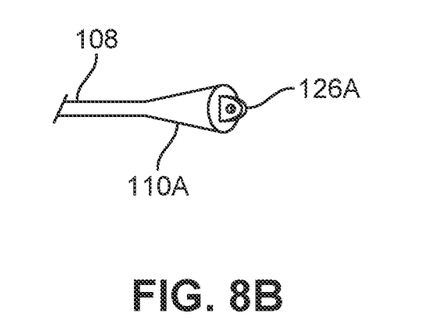
FIG. 8B exemplarily illustrates a perspective view of the first engaging member of the leader line of FIG. 1.
Figure 8C:
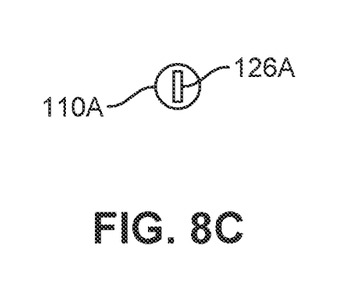
FIG. 8C exemplarily illustrates a front view of the first engaging member of the leader line of FIG. 1.

FIG. 8A exemplarily illustrates a side view of the first engaging member 110A of the leader line 108. FIG. 8B exemplarily illustrates a perspective view of the first engaging member 110A of the leader line 108. FIG. 8C exemplarily illustrates a front view of the first engaging member 110 of the leader line 108. Referring to FIG. 8A to FIG. 8C, the first end of the leader line 108 comprises the first engaging member 110A. Further, the projecting member 126A is disposed on the first engaging member 110A.

Figure 9A:
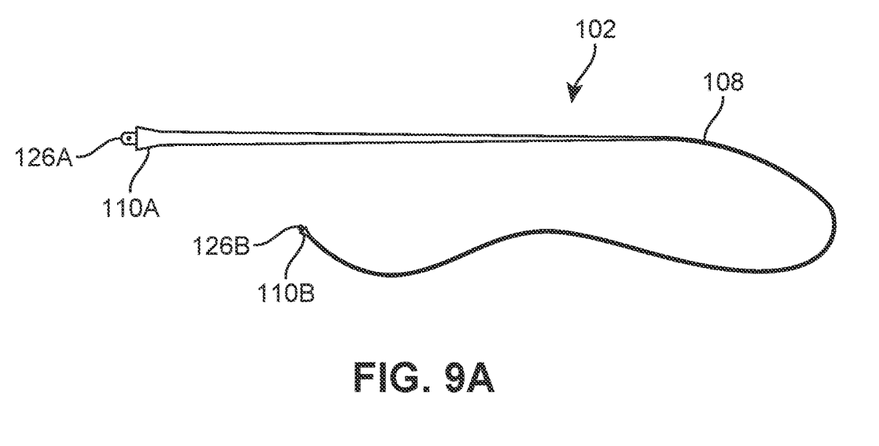
FIG. 9A exemplarily illustrates a fishing leader, according to another embodiment of the present invention.
Figure 9B:
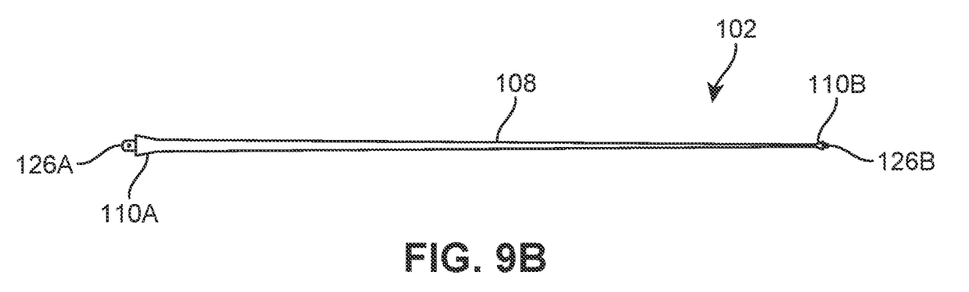
FIG. 9B exemplarily illustrates a fishing leader, according to yet another embodiment of the present invention.
Figure 9C:
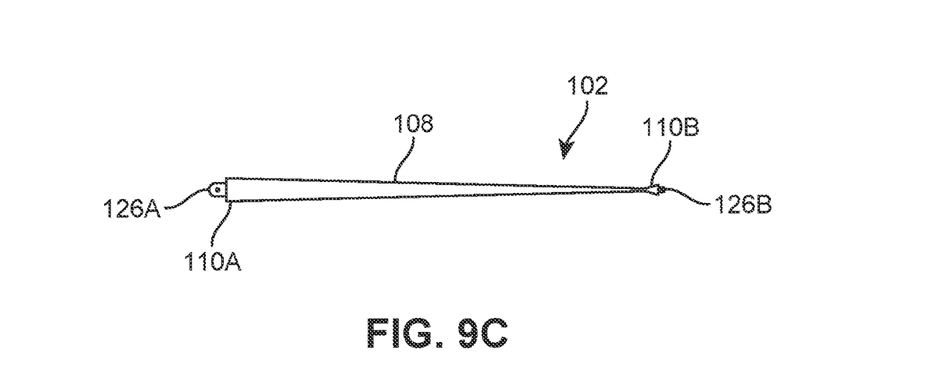
FIG. 9C exemplarily illustrates a fishing leader, according to yet another embodiment of the present invention.
Figure 9D:
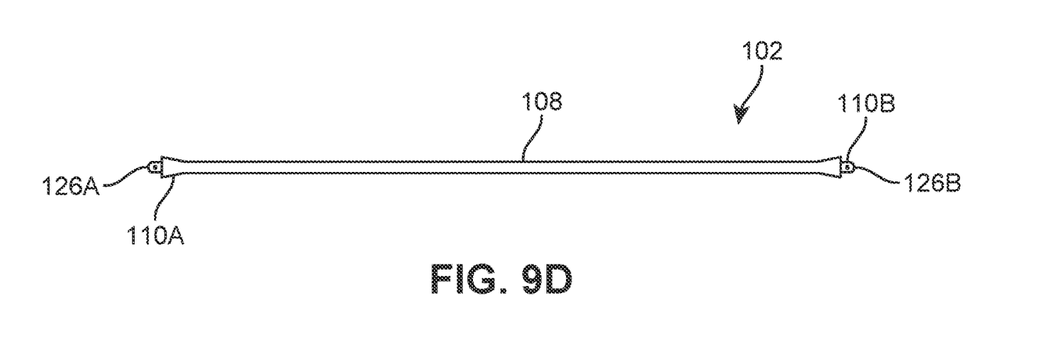
FIG. 9D exemplarily illustrates a fishing leader, according to yet another embodiment of the present invention.

Referring to FIG. 9A through FIG. 9C, the fishing leader 102 has different lengths. The fishing line 108 tapers from the first end to the second end. The fishing line 108 comprises the first engaging member 110A at the first end and the second engaging member 110B at the second end of the line 108. Further, each engaging member 110A, 110B comprises the projecting member 126A, 126B. Referring to FIG. 9D, the fishing line 108 has uniform width from the first end to the second end.

Figure 10A:
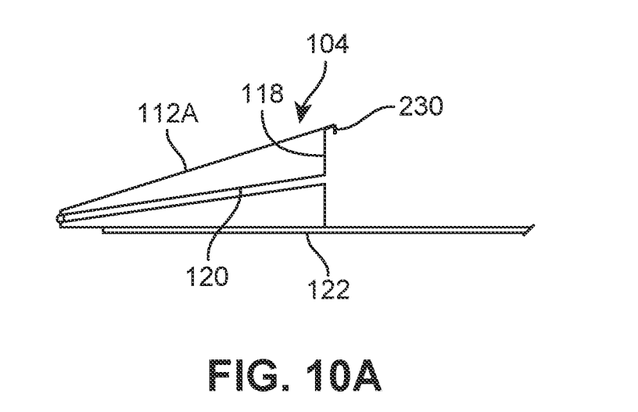
FIG. 10A exemplarily illustrates a first socket member of FIG. 1 with a retention tab.
Figure 10B:
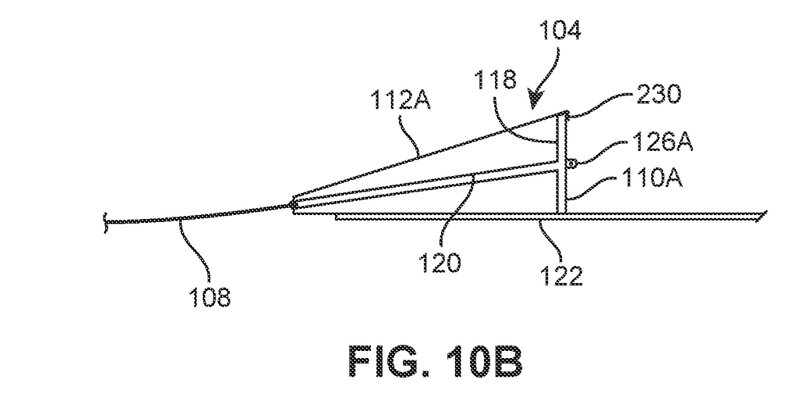
FIG. 10B exemplarily illustrates the retention tab of FIG. 10A retaining the first engaging member.

Referring to FIG. 10A, the first socket member 112A further comprises a retention hook 230. Referring to FIG. 10B, the first socket member 112A configured to receive the first engaging member 110A. The retention hook 230 configured to maintain the position of the first engaging member 110A within the first socket member 112A. Similarly, the second socket member 112B comprises the retention hook 230 to maintain the position of the second engaging member 110A (not shown in Figures).

For installation, the first end of the leader line 108 is slid through the slot 120 into the cavity 118, and the leader line 108 is pulled back until the conical block of the first engaging member 110A locks within the cavity 118 of the first socket member 112A, thereby causing the first end of the leader line 108 to be locked with the fishing hook member 104. The second end of the leader line 108 is slid through the slot 120 into the cavity 118 and the leader line 108 is pulled back until the conical block of the second engaging member 110B locks within the cavity 118 of the second socket member 112B, thereby causing the second end of the leader line 108 to be locked with the fishing hook member 104. Further, the retention hook 230 on the first socket member 112A is configured to maintain the position of the first engaging member 110A and the retention hook 230 on the second socket member 112B is configured to maintain the position of the second engaging member 110B. Thus, the present invention facilitates the connection of fishing leader 102 to the fishing hook member 104 and the swivel 106 without tying knots.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A fishing line connection system, comprising:
   (a) a fishing hook including
      a hook disposed on a first end thereof, and
      a first socket member disposed on a second end thereof;
   (b) a first fishing line having a first engaging member and a second engaging member, the first engaging member and the second engaging member disposed on opposite distal ends thereof; and
   (c) a second fishing line having a second socket member disposed on a distal end thereof;
   wherein
      the first socket member receives and locks the first engaging member; and
      the second socket member receives and locks the second engaging member.

2. The fishing line connection system of claim 1, wherein the first socket member and the second socket member each include a respective cavity and a slot extending along a lateral side thereof that opens into the cavity.

3. The fishing line connection system of claim 1, wherein the second fishing line includes is a swivel connector.

4. The fishing line connection system of claim 1, wherein the first fishing line is a leader line.

5. The fishing line connection system of claim 1, wherein the first socket member and the second socket member each includes a respective retention tab.

\* \* \* \* \*